US008673108B2

(12) United States Patent
Liang et al.

(10) Patent No.: US 8,673,108 B2
(45) Date of Patent: *Mar. 18, 2014

(54) CURABLE EPOXY RESIN-BASED ADHESIVE COMPOSITIONS

(75) Inventors: Jeng-Li Liang, Auburn Hills, MI (US); Rajat K. Agarawal, Düsseldorf (DE); Gregory A. Ferguson, Harrison Township, MI (US); Olaf Lammerschop, Danville, CA (US); Frank Dittrich, Sinsheim (DE); Rainer Schoenfeld, Düsseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 394 days.

This patent is subject to a terminal disclaimer.

(21) Appl. No.: 12/363,830

(22) Filed: Feb. 2, 2009

(65) Prior Publication Data

US 2009/0294057 A1   Dec. 3, 2009

Related U.S. Application Data

(63) Continuation of application No. PCT/US2007/074785, filed on Jul. 31, 2007.

(60) Provisional application No. 60/820,821, filed on Jul. 31, 2006.

(51) Int. Cl.
  *C09J 163/02* (2006.01)
  *C09J 119/00* (2006.01)
  *C09J 175/04* (2006.01)
  *C08L 19/00* (2006.01)
  *C08L 63/02* (2006.01)
  *C08L 75/04* (2006.01)
  *C08G 59/18* (2006.01)
  *C08G 59/22* (2006.01)
  *B32B 27/18* (2006.01)
  *B32B 27/20* (2006.01)
  *B32B 27/22* (2006.01)
  *B32B 27/38* (2006.01)
  *B32B 27/40* (2006.01)

(52) U.S. Cl.
  USPC ........... 156/330; 523/440; 525/523; 525/524; 525/525; 525/526; 525/528; 525/533

(58) Field of Classification Search
  USPC .................. 156/330; 428/413, 414, 416, 418; 523/440; 525/523, 524, 525, 526, 528, 525/533
  See application file for complete search history.

(56) References Cited

U.S. PATENT DOCUMENTS

| | | |
|---|---|---|
| 2,739,075 A | 3/1956 | Her |
| 2,786,042 A | 3/1957 | Her |
| 2,831,820 A | 4/1958 | Aase et al. |
| 2,966,506 A | 12/1960 | Jordan |
| 3,297,745 A | 1/1967 | Fekete et al. |
| 3,320,187 A | 5/1967 | Burt |
| 3,406,131 A | 10/1968 | Kuehlkamp et al. |
| 3,425,964 A | 2/1969 | Stanley |
| 3,525,779 A | 8/1970 | Hawkins et al. |
| 3,636,133 A | 1/1972 | Hawkins |
| 3,985,703 A | 10/1976 | Ferry et al. |
| 4,116,866 A | 9/1978 | Finlayson |
| 4,180,529 A | 12/1979 | Hofmann |
| 4,315,085 A | 2/1982 | Ozari et al. |
| 4,340,716 A | 7/1982 | Hata et al. |
| 4,360,653 A | 11/1982 | Stevens et al. |
| 4,382,868 A | 5/1983 | House |
| 4,390,662 A | 6/1983 | Ando et al. |
| 4,412,018 A | 10/1983 | Finlayson et al. |
| 4,419,496 A | 12/1983 | Henton et al. |
| 4,434,076 A | 2/1984 | Mardis et al. |
| 4,474,705 A | 10/1984 | Clay et al. |
| 4,474,706 A | 10/1984 | Clay et al. |
| 4,486,582 A | 12/1984 | Hefner |
| 4,517,112 A | 5/1985 | Mardis et al. |
| 4,569,923 A | 2/1986 | Knudson, Jr. et al. |
| 4,618,658 A | 10/1986 | Hefner et al. |
| 4,621,025 A * | 11/1986 | Smith .......................... 428/414 |
| 4,664,842 A | 5/1987 | Knudson, Jr. et al. |
| 4,695,402 A | 9/1987 | Finlayson et al. |
| 4,702,962 A | 10/1987 | Kojo et al. |
| 4,719,268 A | 1/1988 | Hefner et al. |
| 4,742,098 A | 5/1988 | Finlayson et al. |
| 4,778,851 A | 10/1988 | Henton et al. |
| 4,894,182 A | 1/1990 | Cody et al. |
| 5,006,611 A | 4/1991 | Schmid et al. |
| 5,030,698 A | 7/1991 | Mulhaupt et al. |
| 5,073,601 A | 12/1991 | Mulhaupt et al. |
| 5,075,033 A | 12/1991 | Cody et al. |
| 5,084,532 A | 1/1992 | Schenkel |
| 5,110,501 A | 5/1992 | Knudson, Jr. et al. |
| 5,160,454 A | 11/1992 | Knudson, Jr. et al. |
| 5,198,524 A | 3/1993 | Bush et al. |
| 5,202,390 A | 4/1993 | Mulhaupt et al. |
| 5,218,063 A | 6/1993 | Kimball |
| 5,223,586 A | 6/1993 | Mautner et al. |
| 5,232,996 A | 8/1993 | Shah et al. |

(Continued)

FOREIGN PATENT DOCUMENTS

| | | |
|---|---|---|
| CA | 1330143 C | 6/1994 |
| CA | 1334700 C | 3/1995 |

(Continued)

OTHER PUBLICATIONS

Machine translation of JP 06-287411 A, provided by the JPO website (no date).*

(Continued)

*Primary Examiner* — Michael J Feely
(74) *Attorney, Agent, or Firm* — Steven C. Bauman

(57) ABSTRACT

This invention relates to compositions useful as adhesives and more particularly to the preparation of epoxy-based adhesive composition with improved impact resistance and good adhesion to oily metal substrates.

37 Claims, No Drawings

(56) References Cited

U.S. PATENT DOCUMENTS

| | | | |
|---|---|---|---|
| 5,278,257 A | 1/1994 | Mulhaupt et al. | |
| 5,290,857 A | 3/1994 | Ashida et al. | |
| 5,334,654 A | 8/1994 | Starner et al. | |
| 5,336,647 A | 8/1994 | Nae et al. | |
| 5,382,635 A | 1/1995 | McInnis et al. | |
| 5,429,999 A | 7/1995 | Nae et al. | |
| 5,506,283 A | 4/1996 | McInnis et al. | |
| 5,534,594 A | 7/1996 | Troy et al. | |
| 5,547,713 A | 8/1996 | Alvarado | |
| 5,637,179 A | 6/1997 | Nakayama et al. | |
| 5,663,111 A | 9/1997 | Gadberry et al. | |
| 5,677,387 A | 10/1997 | Bayard et al. | |
| 5,686,509 A | 11/1997 | Nakayama et al. | |
| 5,686,534 A | 11/1997 | Bayard et al. | |
| 5,693,714 A | 12/1997 | Bauman et al. | |
| 5,700,891 A | 12/1997 | Huver et al. | |
| 5,728,764 A | 3/1998 | Bauer et al. | |
| 5,739,087 A | 4/1998 | Dennis | |
| 5,755,468 A | 5/1998 | Buchanan, Jr. | |
| 5,755,486 A | 5/1998 | Wycech | |
| 5,789,482 A | 8/1998 | Eldin et al. | |
| 5,863,970 A | 1/1999 | Ghoshal et al. | |
| 5,886,112 A | 3/1999 | Vuillemin et al. | |
| 5,891,367 A | 4/1999 | Basheer et al. | |
| 5,891,697 A | 4/1999 | Croteau et al. | |
| 5,969,053 A | 10/1999 | Bauman et al. | |
| 5,981,659 A | 11/1999 | Geck et al. | |
| 6,015,865 A | 1/2000 | Blank et al. | |
| 6,036,765 A | 3/2000 | Farrow et al. | |
| 6,037,392 A | 3/2000 | Tang et al. | |
| 6,045,898 A | 4/2000 | Kishi et al. | |
| 6,063,839 A | 5/2000 | Oosedo et al. | |
| 6,070,427 A | 6/2000 | Fine et al. | |
| 6,111,015 A * | 8/2000 | Eldin et al. | 525/65 |
| 6,147,142 A | 11/2000 | Geck et al. | |
| 6,180,693 B1 | 1/2001 | Tang et al. | |
| 6,316,528 B1 | 11/2001 | Iida et al. | |
| 6,323,263 B1 | 11/2001 | Kuwabawa et al. | |
| 6,331,580 B1 | 12/2001 | Molnar | |
| 6,332,731 B1 | 12/2001 | Wycech | |
| 6,348,513 B1 | 2/2002 | Hilborn et al. | |
| 6,372,350 B1 | 4/2002 | Scott et al. | |
| 6,534,570 B2 | 3/2003 | Farrow et al. | |
| 6,555,187 B1 | 4/2003 | Kitamura | |
| 6,573,309 B1 | 6/2003 | Reitenbach et al. | |
| 6,635,108 B1 | 10/2003 | Farrow et al. | |
| 6,652,774 B2 | 11/2003 | Zhou et al. | |
| 6,776,869 B1 | 8/2004 | Schenkel | |
| 6,787,592 B1 | 9/2004 | Powell et al. | |
| 6,884,854 B2 | 4/2005 | Schoenfeld et al. | |
| 6,894,113 B2 | 5/2005 | Court et al. | |
| 6,998,011 B2 | 2/2006 | Schoenfeld et al. | |
| 7,125,461 B2 | 10/2006 | Czaplicki et al. | |
| 7,919,555 B2 * | 4/2011 | Agarwal et al. | 524/500 |
| 2001/0009952 A1 | 7/2001 | Tan et al. | |
| 2002/0089071 A1 | 7/2002 | Sumita et al. | |
| 2002/0106515 A1 | 8/2002 | Carpenter et al. | |
| 2003/0051807 A1 | 3/2003 | Yamaguchi et al. | |
| 2003/0125423 A1 | 7/2003 | George et al. | |
| 2003/0187154 A1 | 10/2003 | Schoenfeld et al. | |
| 2003/0196753 A1 | 10/2003 | Schoenfeld et al. | |
| 2003/0211953 A1 | 11/2003 | Glenn et al. | |
| 2004/0039084 A1 | 2/2004 | Beisele | |
| 2004/0058181 A1 * | 3/2004 | Garnault et al. | 428/539.5 |
| 2004/0181013 A1 | 9/2004 | Schenkel | |
| 2004/0266899 A1 | 12/2004 | Muenz et al. | |
| 2005/0000619 A1 | 1/2005 | Schenkel et al. | |
| 2005/0016677 A1 | 1/2005 | Carlson et al. | |
| 2005/0022929 A1 | 2/2005 | Schoenfeld et al. | |
| 2005/0070634 A1 | 3/2005 | Lutz et al. | |
| 2005/0124761 A1 | 6/2005 | Schultes et al. | |
| 2005/0129955 A1 | 6/2005 | Schoenfeld et al. | |
| 2005/0159511 A1 | 7/2005 | Kramer | |
| 2005/0209401 A1 | 9/2005 | Lutz et al. | |
| 2005/0215730 A1 | 9/2005 | Schoenfeld | |
| 2005/0249891 A1 | 11/2005 | Kitamura et al. | |
| 2005/0282990 A1 | 12/2005 | Schoenfeld et al. | |
| 2006/0022790 A1 | 2/2006 | Mori et al. | |
| 2006/0030682 A1 | 2/2006 | Hurley et al. | |
| 2006/0228545 A1 * | 10/2006 | Husemann et al. | 428/355 EP |
| 2007/0034432 A1 | 2/2007 | Rosenberg et al. | |
| 2007/0036971 A1 | 2/2007 | Inada et al. | |
| 2007/0066721 A1 | 3/2007 | Kramer et al. | |
| 2007/0104958 A1 | 5/2007 | Golden | |
| 2007/0105983 A1 | 5/2007 | Kramer et al. | |
| 2007/0116961 A1 | 5/2007 | Connell et al. | |
| 2007/0251419 A1 | 11/2007 | Yamaguchi et al. | |
| 2008/0029200 A1 | 2/2008 | Sheasley | |
| 2008/0051524 A1 | 2/2008 | Ji et al. | |
| 2008/0063816 A1 | 3/2008 | Imalzumi et al. | |
| 2008/0071002 A1 | 3/2008 | Jethmalani et al. | |
| 2008/0172807 A1 | 7/2008 | Brun | |
| 2008/0188609 A1 * | 8/2008 | Agarwal et al. | 524/504 |
| 2009/0294057 A1 | 12/2009 | Liang et al. | |
| 2010/0130655 A1 * | 5/2010 | Agarwal et al. | 524/145 |
| 2011/0206890 A1 | 8/2011 | Belpaire et al. | |

FOREIGN PATENT DOCUMENTS

| | | |
|---|---|---|
| CA | 2346634 A1 | 4/2000 |
| CA | 2510486 A1 | 7/2004 |
| CA | 2518618 A1 | 9/2004 |
| CA | 2532215 A1 | 1/2005 |
| CA | 2557352 A1 | 9/2005 |
| EP | 342035 A2 | 11/1989 |
| EP | 0971011 A2 | 1/2000 |
| EP | 1506975 A1 | 2/2005 |
| EP | 0836892 B1 | 6/2005 |
| EP | 1602702 A1 | 12/2005 |
| EP | 1632533 A1 | 3/2006 |
| FR | 2910309 A1 | 6/2008 |
| JP | 58-063758 A | 4/1983 |
| JP | 58-069265 A | 4/1983 |
| JP | 61252224 A | 11/1986 |
| JP | 63081121 A | 4/1988 |
| JP | 04332785 A | 11/1992 |
| JP | 5111973 A | 5/1993 |
| JP | 06-287411 A * | 10/1994 ............ C08L 63/02 |
| JP | 09025393 A | 1/1997 |
| JP | 9040831 A | 2/1997 |
| JP | 09095599 A | 4/1997 |
| JP | 11172076 A | 6/1999 |
| JP | 11221875 A | 8/1999 |
| JP | 2000017246 A | 1/2000 |
| JP | 2000141538 A | 5/2000 |
| JP | 2000347203 A | 12/2000 |
| JP | 2001019929 A | 1/2001 |
| JP | 2002284849 A | 10/2002 |
| JP | 2003020379 A | 1/2003 |
| JP | 2003277579 A | 10/2003 |
| JP | 2003286391 A | 10/2003 |
| JP | 2005248134 A | 9/2005 |
| JP | 2005255822 A | 9/2005 |
| KR | 2004-0044913 A | 6/2004 |
| KR | 100524830 B1 | 10/2005 |
| WO | 9617880 A1 | 6/1996 |
| WO | 0052088 A1 | 9/2000 |
| WO | 2005062369 A1 | 7/2005 |
| WO | 2005108487 A1 | 11/2005 |
| WO | 2006107273 A1 | 10/2006 |
| WO | WO 2006/128722 A1 | 12/2006 |
| WO | WO 2007025007 A1 * | 3/2007 ............ C08L 63/00 |

OTHER PUBLICATIONS

Partial translation of JP 06-287411 (paragraphs 0011-0012), provided by the USPTO translations branch (no date).*
International Search Report dated Dec. 17, 2007, International Application PCT/US2007/074785.
Written Opinion dated Dec. 17, 2007, International Application PCT/US2007/074785.
Kishi, H. et al. "Shear ductility and toughenability study of highly cross-linked epoxy/polyethersulphone" Journal of Materials Science, Chapman & Hall, vol. 32, No. 3, Feb. 1997, pp. 761-771.

(56) References Cited

OTHER PUBLICATIONS

Product Data Sheet for NACURE Super XC-7231 Catalyst, provided by King Industries (no date), received Mar. 3, 2004.
Definition of "Ammonium Antimonate", (p. 285); Watts' Dictionary of Chemistry, (1890), pp. 282-294.
International Search Report and Written Opinion, dated Mar. 30, 2007, International Application PCT/US2006/041484.
"The Next Kaneka" publication date unknown; Retrieved from www.Kaneka.com on Feb. 11, 2008.
Ebenhoch, Jochen. "Tough and Heat-resistant: New Silicone Particles for Thermosets," Kunststoffe plast eroupe, Dec. 2004.

\* cited by examiner

CURABLE EPOXY RESIN-BASED ADHESIVE COMPOSITIONS

CROSS-REFERENCE

This application is a continuation under 35 U.S.C. Sections 365(c) and 120 of International Application No. PCT/US2007/074785, filed Jul. 31, 2007, which claims priority from U.S. Provisional Patent Application Ser. No. 60/820,821 filed Jul. 31, 2006, which are incorporated herein by reference in their entirety.

BACKGROUND OF THE INVENTION

1. Field of the Invention

This invention relates to compositions useful as adhesives and more particularly to the preparation of epoxy-based adhesive compositions with improved impact resistance and/or improved adhesion to oily metal substrates.

2. Brief Discussion of the Related Art

Numerous compositions and processes are described in the art for making and using a wide variety of epoxy-based compositions and other resins and additives in an effort to improve the expansion, impact resistance and other key properties of adhesives useful in adhering, filling and making composite structures. For example, patents which describe components for the formulation of adhesive compositions and the use of such compositions to adhere various substrates to each other and to provide structural reinforcement include U.S. Pat. Nos. 5,290,857, 5,686,509, 5,334,654, 6,015,865, 5,278,257, 6,884,854, and 6,776,869 and U.S. Patent Application Publication No. 2005-0022929.

For advanced structural adhesive operations such as vehicle assembly, adhesives are required which provide broad cure schedules, stiffness improvement, weld reduction and energy/management. In particular, it would be highly desirable to develop heat-curable structural adhesives that not only have these characteristics but also are capable of forming strong bonds to metal surfaces contaminated with oily substances (especially surfaces comprised of cold rolled steel, which has the advantage of being significantly less expensive than other types of metals that could be used in vehicle construction).

In particular, it is known that the use of core-shell rubber particles that are stably dispersed in an epoxy resin matrix and that are nano-sized (e.g., about 25 to about 200 nm) are capable of improving the impact properties of epoxy-based adhesives. However, such materials tend to interfere with the ability of the cured adhesive to bond strongly with an oil-contaminated metal surface.

SUMMARY OF THE INVENTION

We have discovered that unexpectedly improved adhesive formulations can be prepared by admixing epoxy resin, rubber particles (preferably having a core-shell structure and/or an average particle size of less than 500 nm), at least one additive selected from the group consisting of polyurethanes, platy fillers, and anti-oxidants, at least one plasticizer (e.g., sulfonate plasticizers, phosphate ester plasticizers), and at least one latent curing agent capable of being activated by heating. Optionally, such compositions also contain chelate-modified epoxy resin, auxiliary impact modifiers/toughening agents, fillers other than mica (e.g., calcium oxide), thixotropic agents (e.g., fumed silica, mixed mineral thixotropes), or other adjuvants. When applied to a substrate or carrier and cured by heating, the adhesive results in a product capable of forming strong bonds to oil-contaminated metal surfaces while simultaneously exhibiting good impact toughness and/or impact resistance.

DETAILED DESCRIPTION OF CERTAIN EMBODIMENTS OF THE INVENTION

Particular Embodiments

In one preferred embodiment of the invention, the adhesive composition is comprised of at least one epoxy resin (especially a diglycidyl ether of a polyphenol such as bisphenol A), at least one type of core-shell rubber particles, at least one plasticizer (especially a phosphate ester plasticizer), at least one polyurethane (especially a reaction product of an isocyanate-terminated prepolymer and a compound having one or more active hydrogen-containing groups such as hydroxyl and amino groups, e.g., phenolic, benzyl alcohol, aminophenyl or benzylamino groups, as described for example in U.S. Pat. No. 5,278,257), at least one epoxy-based prepolymer obtained by reacting one or more amine-terminated polymers such as an amine-terminated polyether with one or more epoxy resins, and at least one heat-activated latent curing agent.

In another preferred embodiment of the invention, the adhesive composition is comprised of at least one epoxy resin (especially a diglycidyl ether of a polyphenol such as bisphenol A), at least one type of core-shell rubber particles, plasticizer (especially a sulfonate plasticizer), at least one epoxy-based prepolymer obtained by reacting one or more amine-terminated polymers such as an amine-terminated polyether with one or more epoxy resins, mica and/or talc, at least one anti-oxidant (especially a hindered phenol anti-oxidant) and at least one heat-activated latent curing agent.

In still another preferred embodiment of the invention, the adhesive composition is comprised of at least one epoxy resin (especially a diglycidyl ether of a polyphenol such as bisphenol A), at least one type of core-shell rubber particles, plasticizer (especially a phosphate ester plasticizer), at least one polyurethane (especially an acrylate-functionalized polyurethane), at least one epoxy-based prepolymer obtained by reacting one or more amine-terminated polymers such as an amine-terminated polyether with one or more epoxy resins, at least one anti-oxidant (especially a hindered phenol anti-oxidant) and at least one heat-activated latent curing agent.

In another embodiment, the adhesive composition is comprised of at least one epoxy resin (especially a diglycidyl ether of a polyphenol such as bisphenol A), core-shell rubber particles having an average particle size of from 50 to 250 nm and stably dispersed in a liquid epoxy resin matrix, at least one polyurethane, at least one phosphate ester plasticizer, and at least one platy filler (in particular, mica and/or talc). Such formulations can attain particular strong adhesion to cold rolled steel while simultaneously also displaying superior impact properties.

Epoxy Resins

In general, a large number of polyepoxides having at least about two 1,2-epoxy groups per molecule are suitable as epoxy resins for the compositions of this invention. The polyepoxides may be saturated, unsaturated, cyclic or acyclic, aliphatic, alicyclic, aromatic or heterocyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefor are, for example, resorcinol, pyrocatechol, hydroquinone, bisphenol A (bis(4-hydroxyphenyl)-2,2-propane), bisphenol F (bis(4- hydroxyphenyl)methane), bis(4-hydroxyphenyl)-1,1-isobutane, 4,4'-dihydroxybenzophenone, bis(4-hydroxyphenyl)-1,1-ethane, and 1,5-hydroxynaphthalene. Other suitable polyphenols as the basis for the polyglycidyl ethers are the known condensation products of phenol and formaldehyde or acetaldehyde of the novolak resin-type.

Other polyepoxides that are in principle suitable are the polyglycidyl ethers of polyalcohols or diamines. Such polyglycidyl ethers are derived from polyalcohols, such as ethylene glycol, diethylene glycol, triethylene glycol, 1,2-propylene glycol, 1,4-butylene glycol, triethylene glycol, 1,5-pentanediol, 1,6-hexanediol or trimethylolpropane.

Other polyepoxides are polyglycidyl esters of polycarboxylic acids, for example, reaction products of glycidol or epichlorohydrin with aliphatic or aromatic polycarboxylic acids, such as oxalic acid, succinic acid, glutaric acid, terephthalic acid or a dimeric fatty acid. Other epoxides are derived from the epoxidation products of olefinically-unsaturated cycloaliphatic compounds or from natural oils and fats.

Particular preference is given to the liquid epoxy resins derived by reaction of bisphenol A or bisphenol F and epichlorohydrin. The epoxy resins that are liquid at room temperature generally have epoxy equivalent weights of from 150 to about 480.

The epoxy resins that are solid at room temperature may also or alternatively be used and are likewise obtainable from polyphenols and epichlorohydrin; particular preference is given to those based on bisphenol A or bisphenol F having a melting point of from 45 to 130° C., preferably from 50 to 80° C. They differ from the liquid epoxy resins substantially by the higher molecular weight thereof, as a result of which they become solid at room temperature. The solid epoxy resins generally have an epoxy equivalent weight of ≥400.

Typically, the composition may contain from about 25 to about 55 weight percent (in one embodiment, from about 30 to about 50 weight percent) of epoxy resin.

Polyurethanes

In accordance with one aspect of this invention, the adhesive composition contains one or more polyurethanes. The polyurethane may be any oligomeric or polymeric substance containing a plurality of urethane and/or urea linkages and one or more "soft" (elastomeric) segments having a glass transition temperature less than room temperature (e.g., less than about 0° C., less than about −20° C., or less than about −40° C.). The urethane and urea linkages are typically formed by reaction of an active hydrogen-containing material such as a polyol (e.g., polyether polyol, polyester polyol, monomeric polyalcohol, polybutadiene polyol) or polyamine with an isocyanate (in particular, compounds containing two or more isocyanate groups per molecule). In certain embodiments of the present invention, the polyurethane selected for used is an isocyanate-functionalized polyurethane prepolymer in which at least a portion of the isocyanate groups have been reacted or blocked. The isocyanate groups of the prepolymer may be blocked or reacted with any suitable reactant such as an alcohol (e.g., a phenol), oxime, amine, lactam (e.g., caprolactam), acetoacetate, malonate or the like. In one embodiment of the invention, the blocking groups remain on the polyurethane prepolymer when the adhesive composition is cured, but in other embodiments "de-blocking" takes place such that the polyurethane prepolymer is capable of reacting with other components of the adhesive composition when the composition is cured.

For example, the polyurethane may be a acrylate-functionalized polyurethane such as those described in U.S. Pat. Nos. 3,297,745; 4,360,653; 4,390,662; 4,719,268; 4,486,582; 4,618,658; 5,334,654; and 5,700,891 which are hereby incorporated by reference in their entirety. (Meth)acrylate-functionalized polyurethanes may comprise the reaction product of an isocyanate-terminated urethane prepolymer and an isocyanate-reactive acrylate and/or methacrylate. Isocyanate terminated prepolymers are prepared by reacting a polyfunctional isocyanate, typically an aromatic diisocyanate, with a polyol, preferably a long chain hydroxyl-terminated polyether or polyester polyol, such as the ethylene and propylene oxide adducts of $C_2$ to $C_4$ polyalcohols, polytetramethylene glycol (polyTHF), and polycaprolactone. For enhanced flexibilization of the cured adhesive, the molecular number average weight of the polyol should range from about 400 to 4000, preferably 700 to 2000. Acrylate terminated urethane resins utilizing a polyol having a number average molecular weight of less than 1000 generally are extremely viscous. Higher molecular weight polyols tend to cause premature phase separation in the formulated adhesive leading to poor physical properties. The preferred isocyanate-terminated urethane prepolymer is prepared by any known means, for example, a 2000 mw polypropylene glycol may be reacted with an 80/20 2,4/2,6-toluenediisocyanate mixture. Any other polyisocyanate such as methylenediphenyldiisocyanate (MDI), isophoronediisocyanate, (IPDI) or paraphenylenediisocyanate (PPDI) is also suitable.

The isocyanate-reactive acrylates and methacrylates ("(meth)acrylates") typically used to prepare the (meth)acrylate-functionalized polyurethanes are hydroxy alkylacrylates and methacrylates and these include: hydroxyacrylates such as hydroxyethyl acrylate or methacrylate, hydroxypropyl acrylate or methacrylate, hydroxypentyl acrylate or methacrylate, 2-hydroxyethyl acrylate, 2-hydroxyethyl hexyl methacrylate, hydroxybutyl methacrylate and the like. Typically the ester portion of the acrylate or methacrylate is from a $C_2$-$C_8$ alcohol. Mixtures of different (meth)acrylates may be used.

Additional materials which can be used to prepare substances which we choose to describe as included within the definition of (meth)acrylate-functionalized polyurethanes include the following:

prepolymers having number average molecular weights of 250-10,000, preferably 700-4000, and having glass transition temperatures below about 10 degrees C., preferably below about minus 10 degrees C. The average functionality of these prepolymers is at least 2, preferably 2 to 6 and particularly preferably 2 to 3. The terminal functional groups of the prepolymer are isocyanate-reactive and may be amino or hydroxyl or carboxyl or mercapto, preferably, hydroxyl. Particularly preferred prepolymers include linear and branched polypropylene glycols having number average molecular weights about 700 to about 4000; linear and branched polytetrahydrofurans having number average molecular weights between about 700 and about 4000; linear and branched poly(1,2-buyleneoxide) having number average molecular weights between about 700 and about 4000; and hydroxyl-terminated polyesters having number average molecular weights between about 700 and about 4000;

polyisocyanates, preferably diisocyanates or triisocyanates such as isophonoronediisocyanate, methylenediphenyldiisocyanate, toluenediisocyanate, hexamethylenediisocyanate, tetramethylxyly-lenediisocyanate, and the like; and isocyanate-reactive acrylates or methacrylates, preferably hydroxy acrylates or -methacrylates such as hydroxyethyl-acrylate, hydroxypropylacrylate, hydroxyethylmeth-acrylate, hydroxypropylmethacrylate, and the like.

Chain lengtheners such as diols and triols like 1,4 butanediol, 1,1,1-trimethylolpropane, glycerol, 1,2,6-hexanetriol, pentaerythritol and the like optionally may be employed in combination with the polyol(s), preferably, from 0.01 to about 5% by weight. When triol chain lengtheners, as described above, are added during this reaction and a suitable amount of polyisocyanate is used, branched NCO-tipped prepolymers are produced. Diol chain lengtheners can be used to control the molecular weight of the resulting prepolymer. This NCO-functional polymer is then reacted with the NCO-reactive acrylate or methacrylate to yield materials which are described for the purposes of this invention as (meth)acrylate-functionalized polyurethanes.

(Meth)acrylate-functionalized polyurethanes are also available from commercial sources such as, for example, the acrylate-functionalized polyurethanes sold under the tradename ANCAREZ by Air Products.

Polyurethanes suitable for use in the adhesive compositions of the present invention include the reaction products of isocyanate-terminated prepolymers and compounds having one or more active hydrogen-containing groups (e.g., hydroxyl, thiol and amino groups such as primary aliphatic, cycloaliphatic, heteroaromatic and araliphatic amino, secondary aliphatic, cycloaliphatic, heteroaromatic and araliphatic amino, alkyl amido, phenolic, benzyl alcohol, aminophenyl or benzylamino groups or the like, such as those described in U.S. Pat. Nos. 3,525,779; 3,636,133; 5,278,257; and 6,776,869; published U.S. application 2005-070634, and WO 2006/128722, each of which is incorporated herein by reference in its entirety). Such polyurethanes may or may not contain isocyanate-reactive end groups (e.g., active hydrogen-containing end groups). Polyurethanes of this type are also available commercially from Huntsman Advanced Materials (formerly Vantico) under the tradename RAM.

Also suitable for use as polyurethanes in the present invention are branched aromatic urethane polymers containing ether groups, such as the products sold under the tradenames DESMOCAP 11A and DESMOCAP 12A by Bayer Material Science (which have been described as 4-nonylphenol blocked isocyanate prepolymers or polypropyleneglycol/toluene diisocyanate prepolymers blocked with 4-nonylphenol).

The polyurethane may also be an epoxy-functionalized polyurethane of the type disclosed in published U.S. applications US 2007-0066721 and US 2007-0105983, each of which is incorporated herein by reference in its entirety. Such epoxy-functionalized polyurethanes may, for example, be prepared by reacting an isocyanate-functionalized polyurethane prepolymer with a hydroxy-functionalized glycidyl ether.

In general, the adhesive compositions of the present invention may contain up to about 20 weight % (e.g., about 0.1 to about 10 or about 2 to about 8 weight %) of polyurethane.

In embodiments of the invention where both plasticizer and polyurethane are present, the weight ratio of plasticizer:polyurethane is typically from about 0.1:1 to about 10:1 or, in other embodiments, from about 0.3:1 to about 3:1.

In certain embodiments of the invention, the polyurethane selected for use has plasticizer and/or flexibilizing properties. For example, the polyurethane sold under the tradename DESMOCAP 2540 (which is described as a linear prepolymer based on TDI and polyalkylene glycol prepared using double metal cyanide catalysts, with the isocyanate groups being blocked) by Bayer Material Science could be suitable for such purposes.

Plasticizers

Suitable plasticizers for use in the present invention include, for example, sulfonate plasticizers, phosphate ester plasticizers, sulfonamide plasticizers, glycerin triester plasticizers, dialkyl esters of aliphatic dicarboxylic acids, glycol esters of benzoic acid and the like. Preferably, the plasticizer is not a phthalate-containing plasticizer.

Illustrative sulfonate plasticizers include alkyl sulfonic acid esters of phenolic compounds such as the phenyl cresyl esters of pentadecyl sulfonic acid. Suitable commercially available sulfonate plasticizers include the plasticizer sold by Bayer under the tradename MESAMOLL.

Phosphate ester plasticizers include the organic esters of phosphoric acid, such as, for example, phenolic esters of phosphoric acid, e.g., tricresyl phosphate, cresyl diphenyl phosphate, isopropylated triphenyl phosphate, 2-ethylhexyl diphenyl phosphate, isodecyl diphenyl phosphate, and triphenyl phosphate, as well as other triaryl phosphates and alkyl diaryl phosphates. Other suitable phosphate plasticizers include, but are not limited to, tributoxyethyl phosphate, tributyl phosphate, and the like.

Suitable glycerin triester plasticizers include the compounds described in U.S. Pat. No. 6,652,774, incorporated herein by reference in its entirety.

Sulfonamide plasticizers may also be utilized, including, for example, aromatic sulfonamides such as N-(2-hydroxypropyl)benzene sulfonamide (sold under the tradename UNIPLEX 225 by Unitex Chemical Co.), N-ethyl toluene sulfonamides, N-(n-butyl)benzene sulfonamide, N-cyclohexyl-p-toluenesulfonamide, and the like.

Other plasticizers suitable for use in the present invention include C3-C20 dialkyl esters of aliphatic dicarboxylic acids such as adipic acid, e.g., dioctyl adipate, dibutyl adipate, di(2-ethylhexyl)adipate, diisononyl adipate, diisodecyl adipate, and di(heptyl, nonyl)adipate as well as glycol esters of benzoic acid such as dipropylene glycol dibenzoate and dipropylene glycol monobenzoate.

The adhesive compositions of the present invention may contain, for example, up to about 20 weight percent total of plasticizer (e.g., about 0.1 to 10 or about 1 to about 8 weight percent)

Anti-Oxidants

In certain embodiments of the invention, the adhesive composition additionally contains one or more anti-oxidants. Particularly suitable anti-oxidants for purposes of this invention include phenolic (especially hindered phenolic) anti-oxidants such as, for example, the alkylated reaction products of phenols and dienes, such as the butylated reaction product of p-cresol and dicyclopentadiene sold by Eliokem under the tradename WINGSTAY L, and well as stearyl 3-(3,5-di-tert-butyl-4-hydroxyphenyl)propionate (sold under the tradename ANTIOXIDANT 1076 by Akrochem Corp.).

Typically, the anti-oxidant(s) may be present in the adhesive composition at concentrations up to about 3 weight percent (e.g., from about 0.1 to about 2 weight %).

Platy Fillers

In certain embodiments of the invention, the adhesive composition additionally contains one or more platy fillers such as mica, glass flakes, metal flakes, delaminated graphite, talc or clay (e.g., kaolin). Preferably, the mica is muscovite mica such as 4K mica in powder or ground form. The mica particles may, for example, have a relatively high aspect ratio (e.g., from about 5 to about 15), a bulk density of from about 10 to about 20 lb/ft$^3$, and/or a median particle diameter [D (V, 0.5), the size value of particles at which 50% of the sample is smaller and 50% is larger than this value, also known as the mass median diameter] of from about 10 to about 100 microns. Typically, the composition may contain up to about 10 weight percent (e.g., from about 0.1 to about 3 weight percent) platy filler. The surface of the platy filler may optionally be treated, for example, by reaction with a coupling agent such as a silane.

Curing Agents

Since the compositions of the present invention are preferably one-part or single-component compositions and are to be cured at elevated temperature, they also contain one or more curing agents (hardeners) capable of accomplishing crosslinking or curing of certain of the adhesive components when the adhesive is heated to a temperature well in excess of room temperature. That is, the hardener is activated by heating. The hardener may function in a catalytic manner or, in preferred embodiments of the invention, participate directly in the curing process by reaction with one or more of the adhesive components.

There may be used as thermally-activatable or latent hardeners for the adhesive compositions of the present invention, for example, guanidines, substituted guanidines, substituted ureas, melamine resins, guanamine derivatives, cyclic tertiary amines, aromatic amines and/or mixtures thereof. The hardeners may be involved stoichiometrically in the hardening reaction; they may, however, also be catalytically active. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and, more especially, cyanoguanidine (dicyandiamide). Representatives of suitable guanamine derivatives which may be mentioned are alkylated benzoguanamine resins, benzoguanamine resins or methoxymethylethoxymethylbenzoguanamine. For single-component, thermosetting adhesives, the selection criterion is, of course, the low solubility of those substances at room temperature in the resin system, so that solid, finely ground hardeners are preferred; dicyandiamide is especially suitable. Good storage stability of the composition is thereby ensured.

In addition to or instead of the above-mentioned hardeners, catalytically-active substituted ureas may be used. They are especially p-chlorophenyl-N,N-dimethylurea (monuron), 3-phenyl-1,1-dimethylurea (fenuron) or 3,4-dichlorophenyl-N,N-dimethylurea (diuron). In principle, catalytically active tertiary acryl- or alkyl-amines, such as benzyldimethylamine, tris(dimethylamino)phenol, piperidine or piperidine derivatives, may also be used, but they are in many cases too highly soluble in the adhesive system, so that usable storage stability of the single-component system is not achieved. Various imidazole derivatives, preferably solid imidazole derivatives, may also be used as catalytically-active accelerators. Examples which may be mentioned are 2-ethyl-2-methylimidazole, N-butylimidazole, benzimidazole and N—$C_1$ to $C_{12}$-alkylimidazoles or N-arylimidazoles. Particular preference is given to the use of a combination of hardener and accelerator in the form of so-called accelerated dicyandiamides in finely ground form. The separate addition of catalytically-active accelerators to the epoxy hardening system is thus not necessary.

The amount of curing agent utilized will depend upon a number of factors, including whether the curing agent acts as a catalyst or participates directly in crosslinking of the composition, the concentration of epoxy groups and other reactive groups in the composition, the desired curing rate and so forth. Typically, the composition contains from about 0.5 to about 8 weight percent curing agent(s).

Rubber Particles

Rubber particles, especially rubber particles that have a core-shell structure and/or a relatively small average particle size (e.g., less than about 500 nm or less than about 200 nm), are an additional component of the compositions of the present invention. In one embodiment, the rubber particles have a core-shell structure and an average particle size less than about 500 nm. In another embodiment, the rubber particles do not have a shell, but have an average particle size less than about 500 nm. In still another embodiment, the rubber particles have a core-shell structure and an average particle size greater than about 500 nm.

Preferably, the rubber particles are relatively small in size. For example, the average particle size may be from about 0.03 to about 2 microns or from about 0.05 to about 1 micron. In certain embodiments of the invention, the rubber particles have an average diameter of less than about 500 nm. In other embodiments, the average particle size is less than about 200 nm. For example, the rubber particles may have an average diameter within the range of from about 25 to about 200 nm or from about 50 to about 150 nm.

Core-shell rubber particles generally have a core comprised of a polymeric material having elastomeric or rubbery properties (i.e., a glass transition temperature less than about 0° C., e.g., less than about −30° C.) surrounded by a shell comprised of a non-elastomeric polymeric material (i.e., a thermoplastic or thermoset/crosslinked polymer having a glass transition temperature greater than ambient temperatures, e.g., greater than about 50° C.). For example, the core may be comprised of a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth)acrylamides, and the like having a suitably high glass transition temperature. The polymer or copolymer used in the shell may have acid groups that are crosslinked ionically through metal carboxylate formation (e.g., by forming salts of divalent metal cations). The shell polymer or copolymer could also be covalently crosslinked through the use of monomers having two or more double bonds per molecule. The outer surface of the shell may be functionalized with groups such as carboxylic acid groups. Other rubbery polymers may also be suitably be used for the core, including polybutylacrylate or polysiloxane elastomer (e.g., polydimethylsiloxane, particularly crosslinked polydimethylsiloxane). The rubber particle may be comprised of more than two layers (e.g., a central core of one rubbery material may be surrounded by a second core of a different rubbery material or the rubbery core may be surrounded by two shells of different composition or the rubber particle may have the structure soft core, hard shell, soft shell, hard shell). In one embodiment of the invention, the rubber particles used are comprised of a core and at least two concentric shells having different chemical compositions and/or properties. Either the core or the shell or both the core and the shell may be crosslinked (e.g., ionically or covalently), as described, for example, in U.S. Pat. No. 5,686,509 (incorporated herein by reference in its entirety). The shell may be grafted onto the core. The polymer comprising the shell may bear one or more different types of functional groups (e.g., epoxy groups) that are capable of interacting with other components of the compositions of the present invention.

Typically, the core will comprise from about 50 to about 95 percent by weight of the rubber particles while the shell will comprise from about 5 to about 50 percent by weight of the rubber particles.

Methods of preparing rubber particles having a core-shell structure are well-known in the art and are described, for example, in U.S. Pat. Nos. 3,985,703, 4,419,496, 4,778,851, 5,223,586, 5,290,857, 5,534,594, 5,686,509, 5,981,659, 6,111,015, 6,147,142, 6,180,693, 6,331,580 and published U.S. application 2005-124761, each of which is incorporated herein by reference in its entirety. Rubber particles having a core-shell structure are also available from several commercial sources. The following core-shell rubbers are suitable for use in the present invention, for example: the core-shell particles available in powder form from Wacker Chemie under the tradename GENIOPERL, including GENIOPERL P22, P23, P52 and P53, which are described by the supplier as having crosslinked polysiloxane cores, epoxy-functionalized polymethylmethacrylate shells, polysiloxane content of about 65 weight percent, softening points as measured by DSC/DMTA of about 120 degrees C., and a primary particle size of about 100 nm, the core-shell rubber particles available from Rohm & Haas under the tradename PARALOID, in particular the PARALOID EXL 2600/3600 series of products, which are grafted polymers containing a polybutadiene core upon which is grafted a styrene/methylmethacrylate copolymer and having an average particle size of ca. 0.1 to about 0.3 microns, the core-shell rubber particles sold under the tradename DEGALAN by Roehm GmbH or Roehm America, Inc. (e.g., DEGALAN 4899F, which is reported to have a glass transition temperature of about 95° C.), the core-shell rubber particles sold by Nippon Zeon under the tradename F351, and the core-shell rubber particles sold by General Electric under the tradename BLENDEX.

Rubber particles having a core-shell structure may be prepared as a masterbatch where the rubber particles are dispersed in one or more epoxy resins such as a diglycidyl ether of bisphenol A. For example, the rubber particles typically are prepared as aqueous dispersions or emulsions. Such dispersions or emulsions may be combined with the desired epoxy resin or mixture of epoxy resins and the water and other volatile substances removed by distillation or the like. One method of preparing such masterbatches is described in more detail in European Patent Application EP 1632533, incorporated herein by reference in its entirety. For example, an aqueous latex of rubber particles may be brought into contact with an organic medium having partial solubility in water and then with another organic medium having lower partial solubility in water than the first organic medium to separate the water and to provide a dispersion of the rubber particles in the second organic medium. This dispersion may then be mixed with the desired epoxy resin(s) and volatile substances removed by distillation or the like to provide the masterbatch. Other methods for preparing masterbatches of rubber particles having a core-shell structure stably dispersed in an epoxy resin matrix are described in U.S. Pat. Nos. 4,778,851 and 6,111,015, each incorporated herein by reference in its entirety. Preferably, the rubber particles are stably dispersed in the epoxy resin matrix (i.e., the core-shell rubber particles remain as separated individual particles with little or no agglomeration of the particles or precipitation (settling) of the particles from the masterbatch as the masterbatch is aged by standing at room temperature. The shell of the rubber particles may advantageously be functionalized to improve the stability of the masterbatch, although in certain embodiments the shell is non-functionalized (contains no functional groups that react with any of the other components of the adhesive composition when that composition is cured).

Particularly suitable dispersions of rubber particles having a core-shell structure in an epoxy resin matrix are available from Kaneka Corporation under the tradename "ACE MX".

For instance, the core may be formed predominantly from feed stocks of dienes such as butadiene, (meth)acrylates, ethylenically unsaturated nitrites such as acrylonitrile, and/or any other monomers that when polymerized or copolymerized yield a polymer or copolymer having a low glass transition temperature. The outer shells may be formed predominantly from feed stocks of (meth)acrylates such as methylmethacrylate, vinyl aromatic monomers such as styrene and/or ethylenically unsaturated halocarbons such as vinyl chloride and/or any other monomers that when polymerized or copolymerized yield a polymer having a higher glass transition temperature.

The core shell rubbers may have a particle size in the range of 0.07 to 10 microns, such as 0.1 to 5 microns.

The core shell rubber made in this way may be dispersed in an epoxy matrix or a phenolic matrix. The matrix material preferably is liquid at room temperature. Examples of epoxy matrices include the diglycidyl ethers of bisphenol A, F or S, or bisphenol, novalac epoxies, and cycloaliphatic epoxies. Examples of phenolic resins include bisphenol-A based phenoxies.

The core-shell rubber particles may be present in the epoxy or phenolic matrix in an amount in the range of about 5 to about 50% by weight (about 15 to about 40% by weight).

In the inventive formulations, use of these core shell rubbers allows for toughening to occur in the formulation, irrespective of the temperature or temperatures used to cure the formulation. That is, because of the two phase separation inherent in the formulation due to the core shell rubber—as contrasted for instance with a liquid rubber that is miscible or partially miscible or even immiscible in the formulation and can solidify at temperatures different than those used to cure the formulation—there is a minimum disruption of the matrix properties, as the phase separation in the formulation is often observed to be substantially uniform in nature.

In addition, predictable toughening—in terms of temperature neutrality toward cure—may be achieved because of the substantial uniform dispersion.

Many of the core-shell rubber structures available from Kaneka are believed to have a core made from a copolymer of (meth)acrylate-butadiene-styrene, where the butadiene is the primary component in the phase separated particles, dispersed in epoxy resins. Other commercially available masterbatches of core-shell rubber particles dispersed in epoxy resins include GENIOPERL M23A (a dispersion of 30 weight percent core-shell particles in an aromatic epoxy resin based on bisphenol A diglycidyl ether; the core-shell particles have an average diameter of ca. 100 nm and contain a crosslinked silicone elastomer core onto which an epoxy-functional acrylate copolymer has been grafted; the silicone elastomer core represents about 65 weight percent of the core-shell particle), available from Wacker Chemie GmbH.

Typically, the composition may contain from about 5 to about 35 weight percent (in one embodiment, from about 15 to about 30 weight percent) rubber particles having a core-shell structure.

Combinations of different core-shell rubber particles may advantageously be used in the present invention. The core-shell rubber particles may differ, for example, in particle size, the glass transition temperatures of their respective cores and/or shells, the compositions of the polymers used in their respective cores and/or shells, the functionalization of their respective shells, and so forth. A portion of the core-shell particles may be supplied to the adhesive composition in the form of a masterbatch wherein the particles are stably dispersed in an epoxy resin matrix and another portion may be supplied to the adhesive composition in the form of a dry powder (i.e., without any epoxy resin or other matrix material). For example, the adhesive composition may be prepared using both a first type of core-shell particles in dry powder form having an average particle diameter of from about 0.1 to about 0.5 microns and a second type of core-shell particles stably dispersed in a matrix of liquid bisphenol A diglycidyl ether at a concentration of from about 5 to about 50 weight % having an average particle diameter of from about 25 to about 200 nm. The weight ratio of first type:second type core-shell rubber particles may be from about 1.5:1 to about 0.3:1, for example.

In other embodiments of the invention, the rubber particles do not have shells that encapsulate a central core. In such embodiments, the chemical composition of the rubber particles is essentially uniform throughout each particle. However, the outer surface of the particle may be modified by reaction with a coupling agent, oxidizing agent or the like so as to enhance the ability to disperse the rubber particles in the adhesive composition (e.g., reduce agglomeration of the rubber particles, reduce the tendency of the rubber particles to settle out of the adhesive composition). Modification of the rubber particle surface may also enhance the adhesion of the epoxy resin matrix to the rubber particles when the adhesive is cured. The rubber particles may alternatively be irradiated so as to change the extent of crosslinking of the polymer(s) constituting the rubber particles in different regions of the particle. For example, the rubber particles may be treated with gamma radiation such that the rubber is more highly crosslinked near the surface of the particle than in the center of the particle.

The polymers suitable for use in preparing rubber particles that do not have shells may be selected from any of the types of polymers previously described as suitable for use as the core of core-shell rubber particles. The rubber particles thus may be comprised of a polymeric material having elastomeric or rubbery properties (i.e., a glass transition temperature less than about 0° C., e.g., less than about −30° C.). Illustrative suitable polymers include, but are not limited to, diene homopolymers and copolymers and polysiloxanes. The polymer may contain functional groups such as carboxylate groups, hydroxyl groups or the like and may have a linear, branched, crosslinked, random copolymer or block copolymer structure.

Rubber particles that do not have core-shell structures but are nonetheless suitable for use in the present invention are available from commercial sources. For example, the following rubber particles supplied by Eliokem, Inc. may be used: NEP R0401 and NEP R401S (both based on acrylonitrile/butadiene copolymer); NEP R0501 (based on carboxylated acrylonitrile/butadiene copolymer; CAS 9010-81-5); NEP R0601A (based on hydroxy-terminated polydimethylsiloxane; CAS 70131-67-8); and NEP R0701 and NEP 0701S (based on butadiene/styrene/2-vinylpyridine copolymer; CAS 25053-48-9). The foregoing materials are believed to contain minor amounts of inorganic materials such as calcium carbonate or silica.

Rubber particles that have been treated with a reactive gas or other reagent to modify the outer surfaces of the particles by, for instance, creating polar groups (e.g., hydroxyl groups, carboxylic acid groups) on the particle surface, are also suitable for use in the present invention. Illustrative reactive gases include, for example, ozone, $C_{12}$, $F_2$, $O_2$, $SO_3$, and oxidative gases. Methods of surface modifying rubber particles using such reagents are known in the art and are described, for example, in U.S. Pat. Nos. 5,382,635; 5,506,283; 5,693,714; and 5,969,053, each of which is incorporated herein by reference in its entirety. Suitable surface modified rubber particles are also available from commercial sources, such as the rubbers sold under the tradename "Vistamer" by Exousia Corporation.

When the rubber particles do not have a core-shell structure, it will generally be preferred that the particles have a relatively small average particle size. In certain embodiments of the invention, the rubber particles have an average diameter of less than about 500 nm. In other embodiments, the average particle size is less than about 200 nm. For example, the rubber particles may have an average diameter within the range of from about 25 to about 200 nm or from about 50 to about 150 nm.

Where the rubber particles are initially provided in dry form, it may be advantageous to ensure that such particles are well dispersed in the adhesive composition prior to curing the adhesive composition. That is, agglomerates of the rubber particles are preferably broken up so as to provide discrete individual rubber particles, which may be accomplished by intimate and thorough mixing of the dry rubber particles with other components of the adhesive composition. For example, dry rubber particles may be blended with epoxy resin and milled or melt compounded for a length of time effective to essentially completely disperse the rubber particles and break up any agglomerations of the rubber particles.

Typically, in embodiments of this invention where the adhesive composition contains rubber particles and/or auxiliary impact modifier/toughening agent(s), the weight ratio of epoxy resin:combined weight of auxiliary impact modifier/toughening agent (e.g., epoxy-based prepolymer) and rubber particles having a core-shell structure is from about 0.25:1 to about 2.5:1 or from about 0.5:1 to about 1.5:1.

In embodiments of the present invention wherein the adhesive composition contains both rubber particles and one or more auxiliary impact modifiers/toughening agents, the weight ratio of auxiliary impact modifier/toughening agent (e.g., epoxy-based prepolymer):rubber particles is typically from about 3:1 to about 0.2:1 or from about 2:1 to about 0.5:1.

Auxiliary Impact Modifiers/Toughening Agents

The impact properties of cured adhesive compositions in accordance with the present invention can be further improved or modified by the incorporation of one or more auxiliary impact modifiers and/or toughening agents. In one embodiment, the auxiliary impact modifier/toughening agent contains one or more functional groups capable of participating in the reaction of the epoxy resin component when the adhesive composition is cured. Suitable reactive functional groups include epoxy groups, carboxylic acid groups, and the like.

The epoxy-based prepolymers (sometimes described herein as "adducts") obtained by reacting one or more amine-terminated polymers such as amine-terminated polyethers or amino silane capped polymers with one or more epoxy resins represent a particularly preferred class of auxiliary impact modifiers/toughening agents. The epoxy resins useful for such purpose may be selected from among the epoxy resins described hereinabove, with particular preference being given to the diglycidyl ethers of polyphenols such as bisphenol A and bisphenol F (for example, having epoxy equivalent weights of from about 150 to about 1000). Mixtures of solid and liquid epoxy resins may be suitably employed.

The preparation of such epoxy-based prepolymers from amine-terminated polyethers is well known in the art and is described, for example, in U.S. Pat. Nos. 5,084,532 and 6,015,865, each of which is incorporated herein by reference in its entirety. Generally speaking, it will often be desirable to adjust the ratio of amine-terminated polyether:epoxy resin being reacted such that there is an excess of epoxy groups relative to amine groups such that the latter functional groups are completely reacted (i.e., the epoxy-based prepolymer contains essentially no free amine groups).

In the preparation of the epoxy-based prepolymer, the following compounds may, for example, be used:

1. linear amine-terminated polyoxyethylene ethers having the Formula I:

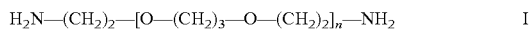

$$H_2N—(CH_2)_2—[O—(CH_2)_3—O—(CH_2)_2]_n—NH_2 \qquad I$$

in which n preferably is 17 to 27.

2. linear amine-terminated polyoxypropylene ethers having the Formula II:

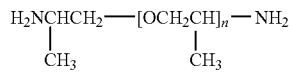

in which n preferably is 5 to 100. They are obtainable from Huntsman Chemical under the trade name JEFFAMINE® (D-series). The number average molecular weight of such amine-terminated polyoxypropylene ethers may vary, for example, from about 300 to about 5000.

3. trifunctional compounds having the Formula III:

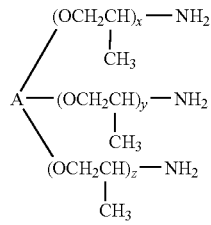

in which A is

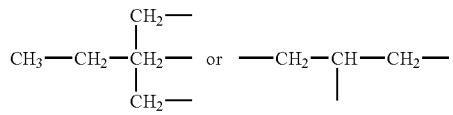

and x, y and z independently of each other are 1 to 40 and x+y+z is preferably >6. Representative examples of these trifunctional compounds are available commercially from Huntsman Chemical under the tradename Jeffamine® (T-series). Such substances typically have number average molecular weights of from about 300 to about 6000.

4. amino silane capped polymers, such as those that may be embraced by the general Formula IV:

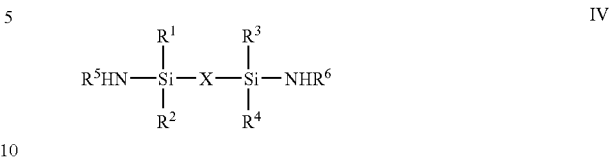

where $R^1$, $R^2$, $R^3$ and $R^4$ may be the same or different and are selected from hydrogen, hydroxy), alkyl, alkoxy, alkenyl, alkenyloxy, aryl, and aryloxy; $R^5$ and $R^6$ may be the same or different and are selected from hydrogen, alkyl and aryl; and X is selected from alkylene, alkenylene, arylene, with or without interruption by a heteroatom; polyurethanes; polyethers; polyesters; polyacrylates; polyamides; polydienes; polysiloxanes; and polyimides.

For instance, amine-terminated siloxanes may be used, such as diamino siloxanes embraced by:

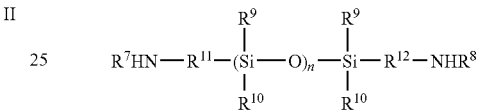

where $R^{11}$ and $R^{12}$ may be the same or different and are selected from alkylene, arylene, alkylene oxide, arylene oxide, alkylene esters, arlyene esters, alkylene amides or arylene amides; $R^9$ and $R^{10}$ may be the same or different and are selected from alkyl or aryl; $R^7$ and $R^8$ are as defined above and n is 1-1,200.

Certain amino-modified silicone fluids that are commercially available from Shin-Etsu under the trade designations KF857, KF858, KF859, KF861, KF864 and KF880 may be useful herein. In addition, Wacker Silicones offers commercially a line of amino-functional silicone fluids designated as L650, L651, L653, L654, L655 and L656, and an amino-functional polydimethylsiloxane under the tradename WACKER FINISH WR 1600 that may be useful herein.

Other amino-functionalized silanes or siloxanes useful in forming the adduct include materials available for purchase from Degussa's Sivento division, such as a proprietary aminofunctional silane composition (called DYNASYLAN® 1126), an oligomeric diaminosilane system (called DYNA-SYLAN® 1146), N-vinylbenzyl-N'-aminoethyl-e-aminopropylpolysiloxane (DYNASYLAN® 1175), N-(n-butyl)-3-aminopropyltrimethoxysilane (DYNASYLAN® 1189), a proprietary aminofunctional silane composition (called DYNASYLAN® 1204), N-(2-aminoethyl)-3-aminopropylmethyldimethoxysilane (DYNASYLAN® 1411), 3-aminopropylmethyldiethoxysilane (DYNASYLAN® 1505), 3-aminopropylmethyldiethoxysilane (DYNASYLAN® 1506), 3-aminopropyltriethoxysilane (DYNASYLAN® AMEO), a proprietary aminosilane composition (called DYNASYLAN® AMEO-T), 3-aminopropyltrimethoxysilane (DYNASYLAN® AMMO), N-2-aminoethyl-3-aminopropyltrimethoxysilane (DYNASYLAN® DAMO), N-(2-aminoethyl)-3-aminopropyltrimethoxysilane (DYNASYLAN® DAMO-T) and a triamino-functional propyltrimethoxysilane (called DYNASYLAN® TRIAMO).

When reacting the epoxy resins with the amine-terminated polyether, an excess of epoxy groups over the amino groups is preferably used so that the latter react completely with epoxide groups. Typically, there is a 1.5 to 10-fold excess, for example a 3.5-fold excess of epoxy groups over the active hydrogen equivalents (AHEW) of the amine-terminated polyether. In preparing the composition according to the present invention, the epoxy-based prepolymer component preferably is initially prepared in a first stage. To this end, preferably, the epoxy resins are reacted with the amine-terminated polyether c) in the desired ratio. The reaction preferably is carried out at high temperature, preferably at 90 to 130° C., for example at approximately 120° C., for a duration of, e.g., three hours.

Other tougheners or impact modifiers known in the epoxy adhesive art may be used in addition to, or as a substitute for, the aforementioned epoxy-based prepolymers derived by reaction of amine-terminated polyethers with epoxy resins. Generally speaking, such tougheners and impact modifiers are characterized by having glass transition temperatures below about 0° C., preferably below about −30° C., even more preferably below about −50° C. Examples of such tougheners and impact modifiers include, but are not limited to:

- reaction products of epoxy-reactive copolymers of conjugated dienes such as butadiene (especially epoxy-reactive copolymers of butadiene with relatively polar comonomers such as (meth)acrylonitrile, (meth)acrylic acid, or alkyl acrylates, e.g., carboxyl-terminated butadiene-nitrile rubbers, such as the products available commercially from Noveon under the trade name HYCAR) with epoxy resins (as described, for example, in U.S. Patent Application Publication Nos. US 2003/0196753 and US 2005-0070634 and U.S. Pat. No. 6,776,869, each of which is incorporated herein by reference in its entirety);
- adducts of anhydrides (e.g., unsaturated anhydrides such as maleic anhydride) and diene polymers (e.g., liquid 1,4-cis polybutadienes), typically having number average molecular weights between about 1000 and about 5000, including for example, the adducts sold under the tradename POLYVEST by Degussa Corporation, as well as further reaction products of such adducts with epoxy resins;
- polyesters, including, for example, amorphous, crystalline and/or semi-crystalline polyesters, including saturated polyesters, prepared by condensation of aliphatic and/or aromatic dicarboxylic acids (or the corresponding alkyl esters or anhydrides with diols having a chain length of C2 to C20, the polyesters being of medium molecular weight (e.g., about 1000 to about 20,000 number average molecular weight), such as the polyesters sold under the tradename DYNACOLL by Degussa Corporation, and including polyesters functionalized with carboxylic acid and/or hydroxyl end groups, as well as adducts of such functionalized polyesters with epoxy resins;
- adducts of dimeric fatty acids with epoxy resins (including, for example, the adducts sold under the tradename EPON 872 by Resolution Performance Products, the adducts sold under the tradename HYPOX DA323 (formerly ERISYS EMDA 3-23) by CVC Specialty Chemicals, as well as those adducts described in U.S. Pat. No. 5,218,063, incorporated herein by reference in its entirety);
- adducts of hydroxyl-containing triglycerides (e.g., castor oil) with epoxy resins (including, for example, the adducts sold under the tradename HELOXY 505 by Resolution Performance Products);
- adducts of polysulfides with epoxy resins (including, for example, the adducts sold under the tradename THIOPLAST EPS 350 by Akzo Nobel;
- adducts of amine-terminated polydienes and diene copolymers with epoxy resins;
- polyether prepolymers capped with hydroxyarylcarboxylic or hydroxyaralkylcarboxylic acids, or a capped polyester, polythioester or polyamide containing polyether segments, as described, for example, in U.S. Pat. No. 5,202,390 (incorporated herein by reference in its entirety), in particular the tougheners of formula I described in detail at column 1, line 59, to column 2, line 16, of said patent;
- block copolymers, wherein at least one polymeric block of the copolymer has a glass transition temperature below 20° C. (preferably below 0° C. or below −30° C. or below −50° C.) and at least one polymeric block of the copolymer has a glass transition temperature above 20° C. (preferably above 50° C. or above 70° C.), in particular block copolymers containing a polystyrene block, a 1,4-polybutadiene block (preferably having a glass transition temperature below about −60 degrees C.) and a polymethylmethacrylate block (preferably, having a highly, i.e., >80%, syndiotactic structure), such as the SBM copolymers made by living polymerization methods using nitroxide initiator (such as the methods described in U.S. Pat. Nos. 5,677,387, 5,686,534, and 5,886,112, each of which is incorporated herein by reference in its entirety) and sold under the tradename NANOSTRENGTH by Arkema and the block copolymers described in U.S. Pat. No. 6,894,113, incorporated herein by reference in its entirety;
- carboxyl-functionalized adducts of amino- or hydroxyl-terminated polymers and carboxylic anhydrides, as well as further reaction products of such adducts with epoxy resins (such as those described in U.S. Pat. No. 6,884,854 and published U.S. application 2005-0215730, each of which is incorporated herein by reference in its entirety);
- epoxy-terminated polyethers, such as polymers of alkylene oxides like ethylene oxide, propylene oxide or mixtures thereof that have been functionalized with epoxy groups, including by reacting the hydroxy groups of a polyalkylene glycol with epichlorohydrin;
- phenol-terminated and aminophenyl-terminated products produced by reacting a stoichiometric excess of a carboxylic anhydride or dianhydride with a diamine or polyamine and then further reacting the excess carboxylic anhydride or carboxylic acid groups with at least one polyphenol or aminophenol, as described, for example, in published U.S. application 2004-0181013, incorporated herein by reference in its entirety.

Mixtures of different auxiliary impact modifiers/toughening agents may be used. The total amount of auxiliary impact modifier/toughening agent in the curable compositions of the present invention may vary substantially but typically is up to about 40 weight percent, e.g. from about 5 to about 25 weight percent.

When an epoxy-based prepolymer is used, the composition typically may contain from about 5 to about 30 weight percent (in one embodiment, from about 10 to about 25 weight percent) of such epoxy-based prepolymer.

Adhesion Promoters

To help improve adhesion of the cured adhesive to a substrate surface, especially a metallic substrate surface contaminated with oily substances as is commonly encountered in vehicle assembly operations, one or more reaction products of epoxy resins and compounds containing chelating functional groups (herein called "chelate-modified epoxy resins") are added to the composition.

Such reaction products include those substances commonly referred to in the art as "chelate epoxies" or "chelating epoxy resins". The chelating functional groups include those functional groups capable of forming chelate bonds with divalent or polyvalent metal atoms, either by themselves or in cooperation with other functional groups positioned on the same molecule. Suitable chelating functional groups include, for example, phosphorus-containing acid groups (e.g., —PO(OH)$_2$), carboxylic acid groups (—CO$_2$H), sulfur-containing acid groups (e.g., —SO$_3$H), amino groups, and hydroxyl groups (particularly hydroxyl groups adjacent to each other on aromatic rings). The preparation of such reaction products may be carried out by methods known in the art such as, for example, those methods described in U.S. Pat. Nos. 4,702,962 and 4,340,716, European Patent No. EP 342 035 and Japanese Patent Document Nos. JP 58-063758 and JP 58-069265, each of which is incorporated herein by reference in its entirety. Reaction products of epoxy resins and compounds containing chelating functional groups are also available from commercial sources such as, for example, the ADEKA Resins EP-49-10N, EP-49-55C, EP-49-10, EP-49-20, EP-49-23, and EP-49-25 sold by Asahi Denka. Typically, the composition may contain up to about 8 weight percent (e.g. from about 0.1 to about 3 weight percent) of such chelate-modified epoxy resins.

Other compounds having metal chelating properties may also be used in the compositions of the present invention to help enhance the adhesion of the cured adhesive to a substrate surface, including, for example, the adhesion promoters described in U.S. Patent Application Publication No. 2005-0129955, incorporated herein by reference in its entirety. Also suitable for use as adhesion promoters are the acetoacetate-functionalized modifying resins sold by King Industries under the brand name K-FLEX XM-B301.

Other Additives

The inventive compositions may, in addition to the aforementioned platy fillers, also contain known fillers such as the various ground or precipitated chalks, quartz powder, alumina, non-platy clays, dolomite, carbon fibers, glass fibers, polymeric fibers, titanium dioxide, fused silica, carbon black, calcium oxide, calcium magnesium carbonates, barite and, especially, silicate-like fillers of the aluminum magnesium calcium silicate type, for example wollastonite and chlorite. Typically, the compositions of the present invention may contain from about 0.5 to about 10 weight percent of fillers.

In one embodiment of the invention, the composition additionally contains one or more expanding agents (sometimes referred to in the art as blowing agents). The expandable properties of the resulting adhesive are particularly useful in applications where the complete filling of a gap or cavity in a part or member is critical in order to maintain maximum structural integrity of the part or member. The foamed cured adhesive has improved fracture toughness, thereby imparting impact resistance to the assembly. If the composition is to be utilized as a one-part or single-component composition, the expanding agent is preferably a latent expanding agent which causes expansion or foaming of the adhesive only when heated to a temperature significantly above room temperature (typically, a temperature which is in the range at which curing of the adhesive is also initiated). Although any suitable expanding agent may be employed, such as a chemical expanding agent, e.g., azo compounds, hydrazides and the like, particular preference is given to expandable microspheres. Expandable microspheres generally comprise small diameter polymeric shells or bubbles which encapsulate one or more volatile substances such as light hydrocarbons or halocarbons. The outer shells are usually thermoplastic in character to permit softening and expansion of the microspheres when heated due to volatilization of the substances trapped within the shells. The polymers used in the shells may be linear, branched, or cross-linked and may be comprised of, for example, acrylic resins, styrenic resins, polyvinylidene chloride, nitrile polymers, and the like. Typically, the average particle size of the expandable microspheres is in the range of from about 5 to about 100 microns. Suitable expandable microspheres are commercially available under the trademark names DUALITE and EXPANCEL from Henkel Corporation and Casco Nobel, respectively.

In yet another embodiment, hollow glass microspheres are present in the composition. Commercially available hollow glass microspheres include the materials sold by Minnesota Mining & Manufacturing under the trademark SCOTCHLITE, with suitable grades including those available under the designations B38, C15, K20 and VS 5500. The glass microspheres preferably have diameters in the range of from about 5 to 200 micrometers and/or densities of from about 0.3 to about 0.5 g/cc. Typically, the composition may contain from about 0.5 to about 5 weight percent of hollow glass microspheres The adhesive compositions according to the present invention may also contain other common adjuvants and additives, such as plasticizers, reactive and/or non-reactive diluents, flow auxiliaries, coupling agents (e.g., silanes), adhesion promoters, wetting agents, tackifiers, flame retardants, thixotropic and/or rheology control agents, ageing and/or corrosion inhibitors, stabilizers and/or coloring pigments. Depending on the requirements made of the adhesive application with respect to its processing properties, its flexibility, the required rigidifying action and the adhesive bond to the substrates, the relative proportions of the individual components may vary within comparatively wide limits.

In one embodiment, the composition includes a reactive diluent such as a mono-epoxide (e.g., monoglycidyl ethers of alkyl- and alkenyl-substituted phenols). Typically, the composition contains up to about 10 weight percent (e.g., from about 0.1 to about 5 weight percent) reactive diluent.

Methods of Use

The inventive composition is suitable for adhering together parts made of different materials, including, for example, wood, metal, coated or pretreated metal, plastic, filled plastic, thermoset materials such as sheet molding compound and fiberglass and the like. The substrates to be joined using the adhesive may be the same as or different from each other. It is preferably used for the gluing of metal parts and particularly for the gluing of steel sheets such as cold rolled steel sheets. These can also be electro-galvanized, hot-dip galvanized and/or zinc/nickel-coated steel sheets, for example. The composition is especially useful for bonding substrates having surfaces contaminated with oily substances, as good adhesion is attained despite such contamination.

The inventive composition can be applied to a substrate surface by any technique known in the art. For example, it can be applied by extrusion from a robot in bead form onto the substrate or by mechanical application methods such as a caulking gun, or any other manual application means, and can also be applied using a swirl or streaming technique. The swirl and streaming techniques utilize equipment well known in the art such as pumps, control systems, dosing gun assemblies, remote dosing devices and application guns. Generally, the adhesive is applied to one or both of the substrates to be joined. The substrates are contacted such that the adhesive is located between the substrates to be bonded together. Thereafter, the adhesive composition is subjected to heating to a temperature at which the heat curable or latent curing agent initiates cure of the epoxy resin composition.

In one embodiment, the adhesive is formulated so as to function as a hot melt; that is, an adhesive which is solid at room temperature, but capable of being converted to a pumpable or flowable material when heated to a temperature above room temperature. In another embodiment, the composition of this invention is formulated to be capable of being flowed or pumped to the work site at ambient temperatures or slightly above since, in most applications, it is preferable to ensure that the adhesive is heated only up to a temperature at which the latent curing agent is not yet activated. The melted composition may be applied directly to the substrate surface or may be allowed to flow into a space separately the substrates to be joined, such as in a hem flanging operation. In yet another embodiment, the composition is formulated (by inclusion of a finely divided thermoplastic or by use of multiple curatives having different activation temperatures, for example) such that the curing process proceeds in two or more stages (partial curing at a first temperature, complete curing at a second, higher temperature). The two parts are joined together, preferably immediately after deposition of the adhesive mass, thereby provisionally bonding the two parts to each other.

The resultant bond preferably already has sufficient strength so that the still uncured adhesive is not readily washed out, as might otherwise occur, for example, if the metal sheets which are provisionally bonded to each other are treated for de-greasing purposes in a wash bath and then in a phosphating bath.

The composition is preferably finally cured in an oven at a temperature which lies clearly above the temperature at which the composition was applied to the parts to be bonded and at or above the temperature at which the curing agent and/or accelerator and/or latent expanding agent (if present) are activated (i.e., in the case of the hardener, the minimum temperature at which the curing agent becomes reactive towards the other components of the adhesive; in the case of the expanding agent, the minimum temperature at which the expanding agent causes foaming or expansion of the adhesive). Curing preferably takes place at a temperature above 150° C., for example at 160 to 220° C., for about 10 to about 120 minutes.

Once cured, the adhesive compositions according to the present invention may be used as casting resins in the electrical or electronics industry or as die attach adhesives in electronics for bonding components to printed circuit boards. Further possible applications for the compositions are as matrix materials for composites, such as fiber-reinforced composites. One particularly preferred application for the adhesives according to the present invention is the formation of structural bonds in vehicle construction such as in hem flanges and the like.

In the embodiment of the invention where the composition includes one or more expanding agents, the adhesive may be utilized to form structural foams which serve to stiffen and reinforce cavities, gaps, structural members and the like. The composition may be supported or contained within a carrier or receptacle or the like so as to position or orient the adhesive such that it expands in one or more particular directions when heated to induce curing and foaming. The composition thus is particularly useful in filling irregularly shaped spaces, as the composition will expand so as to come into contact with a greater portion of the substrate surfaces in the vicinity of the composition than would occur if no expanding agent was present. The foamed, cured composition stiffens and/or increases the energy absorption capacity of vehicle cavities and structural members.

Examples 1-6

A series of adhesive compositions was prepared using the components listed in Table 1 (the amounts of each component being given as weight percent of the total composition) in addition to the following components used in the same amount in each example:

41.00 wt. % Kaneka MX156 epoxy resin/core-shell rubber masterbatch (33 wt. % core-shell rubber particles; Kaneka Co.);

15.00 wt. % epoxy resin/amine-terminated polyether reaction product, prepared in accordance with U.S. Pat. No. 6,015,865;

9.00 wt. % Zeon F351 core-shell rubber particles (Nippon Zeon Chemicals);

2.00 wt. % Adeka Resin EP-49-10N (epoxy equivalent weight=225; 100% solids; Asahi Denka Kogyo);

3.00 wt. % carboxylic anhydride/amine-terminated polyether adduct reacted further with epoxy resin, prepared in accordance with U.S. Pat. No. 6,884,854 or published U.S. application 2005-0215730;

1.50 wt. % GARAMITE 1958 mixed mineral thixotrope (Southern Clay);

wt. % CARDOLITE LITE 2513 reactive diluent (Cardolite Co.);

0.15 wt. % SILQUEST A-187J gamma-glycidoxypropyltrimethoxysilane (GE Advanced Materials);

2.00 wt. % calcium oxide;

0.50 wt. % SYLOTHIX 53 thixotropic agent (J. Rettenmaier & Soehne;

1.50 wt. % CABOSIL TS-720 (Cabot);

0.30 wt. % MONARCH 280 carbon black (Cabot); and 0.50 wt. % AMICURE UR 1,1-dimethyl-3-phenylurea (Air Products).

The components were mixed in a SPEEDMIXER mixer (FlackTek, Inc.) for up to 3 minutes, with the resulting adhesive composition then being de-aired under a vacuum of at least 25 psi for 25 minutes.

Metal coupons of cold rolled steel (CRS) were cleaned with acetone and wiped with a paper towel, before being coated with 3 g/m$^2$ of FERROCOTE 61AUS oil on one side. The adhesive composition was then warm-applied to the oiled side of the coupon. Glass beads (0.25 mm) were sprinkled onto the adhesive layer before overlaying the test coupons. Metal clips were used to hold the two coupons together during the baking cycle. All coupon/adhesive assemblies were cured in accordance with the following bake schedule: 45 minutes at 190° C., 10 minutes at 205° C., 45 minutes at 190° C., and 2 hours at room temperature. Coupons for t-peel testing had 75 mm overlay and a width of 20 mm and were pulled using an Instron tester at a speed of 50 mm/min. The average load at plateau was used to calculate peel strength. Coupons for impact peel testing having ISO 11343 test geometry (30 mm overlay, 20 mm width) were subjected to 90 J impact load at a drop weight speed of 2 m/s. Impact peel strength was measured at average impact load at plateau using an Instron Dynatup 9250 HV impact tester. The test results obtained are shown in Table 1. The composition of Example 6 was found to exhibit a higher t-peel strength and a higher degree of cohesive failure than the compositions of Examples 1-5, while still providing high impact peel resistance. Examples 1-5 showed adhesive failure, which is unacceptable for advanced structural bonding applications. Without wishing to be bound by theory, it is believed that the superior properties achieved in the Example 6 composition may be attributed to the use of a combination of a polyurethane and a phosphate ester plasticizer.

TABLE 1

| Component | Ex. 1 | Ex. 2 | Ex. 3 | Ex. 4 | Ex. 5 | Ex. 6 |
|---|---|---|---|---|---|---|
| Epoxy Resin[1] | 13.05 | 13.05 | 13.05 | 14.90 | 10.25 | 10.25 |
| Polyurethane[2] | — | — | — | — | 5.00 | 5.00 |
| Plasticizer A[3] | 5.00 | 2.50 | — | — | 3.00 | — |
| Plasticizer B[4] | — | 2.50 | 5.00 | 3.00 | — | 3.00 |
| Curing Agent[5] | 4.50 | 4.50 | 4.50 | 4.65 | 4.30 | 4.30 |
| T-peel Strength on CRS, N/mm | 3.8 | 4.3 | 10.4 | 3.4 | 3.8 | 11.6 |
| % Cohesive Failure | 0 | 10 | 60 | 0 | 0 | 100 |
| Impact Peel Resistance at 23° C., N/mm | 28.0 | 25.0 | 28.0 | 25.0 | 29.0 | 28.0 |

[1]EPON 828 (Hexion Specialty Chemicals, Inc.) or DER 331 (Dow) diglycidyl ether of bisphenol A
[2]DY965 CH polyurethane, believed to be prepared in accordance with Example 16 of U.S. Pat. No. 5,278,257 (Huntsman Advanced Materials)
[3]MESAMOLL sulfonate plasticizer (Bayer)
[4]tricresyl phosphate
[5]AMICURE CG1200 dicyandiamide (Air Products)

Example 7

An adhesive composition was prepared containing the following components:

53.66 wt. % epoxy resin/core-shell masterbatch (Kaneka MX156, containing 25 wt. % core-shell rubber particles; Kaneka Co.);
15.00 wt. % epoxy resin/amine-terminated polyether reaction product, prepared in accordance with U.S. Pat. No. 6,015,865;
9.00 wt. % Zeon F351 core-shell rubber particles (Nippon Zeon Chemicals);
1. wt. % MESAMOLL sulfonate plasticizer (Bayer);
2.00 wt. % Adeka Resin EP-49-10N (epoxy equivalent weight=225; 100% solids; Asahi Denka Kogyo);
3.00 wt. % carboxylic anhydride/amine-terminated polyether adduct reacted further with epoxy resin, prepared in accordance with U.S. Pat. No. 6,884,854 or published U.S. application 2005-0215730;
0.64 wt. % WINGSTAY L anti-oxidant (Eliokem);
1.50 wt. % GARAMITE 1958 mixed mineral thixotrope (Southern Clay);
wt. % CARDOLITE LITE 2513 reactive diluent (Cardolite Co.);
0.15 wt. % SILQUEST A-187J gamma-glycidoxypropyltrimethoxysilane (GE Advanced Materials);
2.00 wt. % calcium oxide;
0.85 wt. % muscovite mica 4K;
4.40 wt. % AMICURE CG1200 dicyandiamide (Air Products);
0.50 wt. % SYLOTHIX 53 (J. Rettenmaier & Soehne);
1.50 wt. % CABOSIL TS-720 (Cabot);
0.30 wt. % MONARCH 280 carbon black (Cabot); and
0.50 wt. % AMICURE UR 1,1-dimethyl-3-phenylurea (Air Products).

These components were added together in the order listed above up to the GARAMITE 1958 mixed mineral thixotrope and mixed in a SPEEDMIXER mixer for one minute. The GARAMITE 1958 mixed mineral thixotrope was then added and mixed with the other components for one minute. The next two components were added and mixed together for one minute before adding the final three components and continuing mixing for one minute. The resulting adhesive composition was de-aired under vacuum before being tested as described above in connection with Examples 1-6.

The following test results were obtained:
1. t-peel strength on CRS, 3.8 N/mm;
2. 100% cohesive failure;
3. impact peel resistance at 23° C., 22.5 N/mm.

The excellent properties of the cured adhesive composition, as compared to those of Examples 1-5, are believed to be largely due to the use of a combination of sulfonate plasticizer, mica and anti-oxidant.

Examples 8-10

Two adhesive compositions were prepared using the following components (the amounts of each component being given as weight percent of the total composition) in addition to 5.00 wt. % of a polyurethane (Example 8 used DY965 CH polyurethane sold by Huntsman Advanced Materials and believed to be made in accordance with Example 16 of U.S. Pat. No. 5,278,257; Example 9 used ANCAREZ 2364, an acrylate functionalized polyurethane sold by Air Products):
41.00 wt. % Kaneka MX156 epoxy resin/core-shell rubber masterbatch containing 33 wt. % core-shell rubber particles;
13.00 wt. % epoxy resin (EPON 828 or DER 331, from Dow and Hexion Specialty Chemicals, Inc., respectively);
15.00 wt. % epoxy resin/amine-terminated polyether adduct reacted further with epoxy resin, prepared in accordance with U.S. Pat. No. 6,015,865;
9.00 wt. % Zeon F351 core-shell rubber particles (Nippon Zeon Chemicals);
2.00 wt. % Adeka Resin EP-49-10N (epoxy equivalent weight=225; 100% solids);
3.00 wt. % carboxylic anhydride/amine-terminated polyether reaction product, prepared in accordance with U.S. Pat. No. 6,884,854 or published U.S. application 2005-0215730;
1.50 wt. % GARAMITE 1958 mixed mineral thixotrope (Southern Clay);
wt. % CARDOLITE LITE 2513 reactive diluent (Cardolite Co.);
0.15 wt. % SILQUEST A-187J gamma-glycidoxypropyltrimethoxysilane (GE Advanced Materials);
2.00 wt. % calcium oxide;
4.55 wt. % AMICURE CG1200 dicyandiamide (Air Products);
0.50 wt. % SYLOTHIX 53 thixotropic agent (J. Rettenmaier & Soehne);
1.50 wt. % CABOSIL TS-720 fumed silica (Cabot);
0.30 wt. % MONARCH 280 carbon black (Cabot); and
0.50 wt. % AMICURE UR 1,1-dimethyl-3-phenylurea (Air Products).

An additional adhesive composition (Example 10) was prepared in accordance with Example 9, except that the amount of epoxy resin (EPON 828 or DER 331) was reduced to 9.90 wt. %, the amount of ANCAREZ 2364 polyurethane was reduced to 3.00 wt. %, the amount of AMICURE CG1200 dicyandiamide was reduced to 4.40 wt. % and tricresyl phosphate (5.75 wt. %) and WING STAY L anti-oxidant (0.50 wt. %) were added.

When the adhesive compositions were tested in accordance with the procedures previously described, the results shown in Table 2 were obtained.

TABLE 2

| Property | Example 8 | Example 9 | Example 10 |
|---|---|---|---|
| T-peel Strength on CRS, N/mm | 4.4 | 3.9 | 11.3 |
| % Cohesive Failure | 0 | 0 | 100 |
| Impact Peel Resistance at 23° C., N/mm | 38.0 | 33.0 | 24.0 |

The excellent properties of the cured adhesive composition of Example 10 (in particular, the high t-peel strength and 100% cohesive failure), as compared to those of Examples 8 and 9, are believed to be largely due to the use of a combination of polyurethane, plasticizer, and anti-oxidant.

Examples 11-16

Adhesive compositions were prepared based on the following components:
42.6 parts by weight (pbw) epoxy resin/core-shell rubber masterbatch;
8 pbw EPON 828 epoxy resin (Dow);
15 pbw epoxy resin/amine-terminated polyether reaction product, prepared in accordance with U.S. Pat. No. 6,015,865;
7 pbw Adeka EP-49-10N (epoxy equivalent weight=225; 100% solids; Asahi Denka Kogyo K.K.);
3 pbw CAB-O-SIL TS720 fumed silica (Cabot);
3 pbw calcium oxide;
0.7 pbw DYHARD UR700 urea accelerator (Degussa);
0.3 pbw MONARCH 580 carbon black (Cabot);
9.5 pbw Zeon F351 core-shell rubber particles (Nippon Zeon Chemicals);
4.9 pbw DYHARD 100SH dicyandiamide (Degussa)

Examples 11-13 also included 6 pbw of a blocked polyurethane prepolymer, while Examples 14-16 also included 8 pbw of this component.

The amounts of triphenylphosphate (TPP) plasticizer were varied for each of Examples 11-16 as shown in Table 3. The observed adhesive properties of each composition after curing for 60 minutes at 190° C. are also stated in Table 3 (cf=cohesive failure; scf=surface cohesive failure). T-peel strength was significantly improved on both electrogalvanized steel and hot dipped galvanized steel when triphenylphosphate plasticizer was present in the adhesive formulation.

What is claimed is:
1. A composition comprising:
A) at least one epoxy resin;
B) rubber particles;
C) at least one isocyanate-functionalized polyurethane prepolymer in which at least a portion of the isocyanate groups have been reacted or blocked;
D) at least one heat-activated latent curing agent; and
E) at least one plasticizer,
wherein the at least one plasticizer and the at least one isocyanate-functionalized polyurethane prepolymer are present in a weight ratio of from about 0.3:1 to about 3:1.
2. The composition of claim 1 wherein said rubber particles have an average particle size of less than 500 nm.
3. The composition of claim 1 wherein at least a portion of the rubber particles are provided to the composition in the form of a stable dispersion in an epoxy resin.
4. The composition of claim 1 additionally comprising at least one auxiliary impact modifier/toughening agent.
5. The composition of claim 1 additionally comprising at least one epoxy-based prepolymer obtained by reacting one or more amine-terminated polymers with one or more epoxy resins.
6. The composition of claim 1 in which the at least one epoxy resin is selected from the group consisting of diglycidyl ethers of bisphenol A and bisphenol F.
7. The composition of claim 1 additionally comprising at least one chelate-modified epoxy resin.
8. The composition of claim 1 additionally comprising at least one anti-oxidant.
9. The composition of claim 1, wherein the at least one plasticizer is a phosphate ester plasticizer.
10. The composition of claim 1, wherein said rubber particles have a core-shell structure.
11. The composition of claim 10, wherein said rubber particles have a core comprising a diene homopolymer, diene copolymer or polysiloxane elastomer.
12. The composition of claim 10, wherein said rubber particles have a shell comprising an alkyl (meth)acrylate homopolymer or copolymer.
13. The composition of claim 1, wherein said rubber particles have an average particle size of less than about 250 nm.
14. The composition of claim 1, wherein the at least one plasticizer is a sulfonate plasticizer.
15. The composition of claim 1, wherein said at least one plasticizer is selected from the group consisting of phenolic esters of phosphoric acid and alkyl sulfonic acid esters of phenolic compounds.
16. The composition of claim 1, wherein said at least one plasticizer is selected from the group consisting of triphenylphosphate, tricresyl phosphate, and phenyl cresyl esters of pentadecyl sulfonic acid.

TABLE 3

|  | Ex. 11 | Ex. 12 | Ex. 13 | Ex. 14 | Ex. 15 | Ex. 16 |
|---|---|---|---|---|---|---|
| TPP, pbw | 0 | 2 | 3 | 0 | 2 | 3 |
|  | T-Peel, N/mm | T-Peel, N/mm | T-Peel, N/mm | T-Peel, N/mm | T-Peel, N/mm | T-Peel, N/mm |
| EGS | 8.3 | 10.4 | 10.2 | 8.8 | 11 | 9.3 |
| HDG | 9.7 | 15.2 | 16.1 | 10.9 | 16.6 | 16.0 |
|  | % cf/% scf | % cf/% scf | % cf/% scf | % cf/% scf | % cf/% scf | % cf/% scf |
| EGS | 70 | 30/70 | 70/30 | 20/10 | 80/20 | 10/90 |
| HDG | 0/10 | 60/40 | 40/60 | 0/10 | 90/10 | 100 |

17. The composition of claim 1, wherein said composition comprises from 1 to 8 weight percent of said at least one plasticizer.

18. A method of making a composite article which comprises: contacting a surface with the composition of claim 1 and curing the composition in contact with the surface to prepare a composite article.

19. The method of claim 18 in which at least two surfaces are contacted with the composition and cured in contact therewith.

20. The method of claim 18 wherein the surface is contaminated with at least one oily substance and the composition additionally comprises at least one chelate-modified epoxy resin.

21. The composition of claim 1, wherein the at least one isocyanate-functionalized polyurethane prepolymer is selected from the group consisting of acrylate-functionalized polyurethanes and isocyanate-functionalized polyurethane prepolymers in which at least a portion of the isocyanate groups have been reacted or blocked with a phenol.

22. A composition comprising:
A) at least one epoxy resin;
B) rubber particles;
C) at least one platy filler;
D) at least one antioxidant;
E) at least one heat-activated latent curing agent;
F) at least one sulfonate plasticizer; and
wherein the at least one sulfonate plasticizer is selected from the group consisting of phenyl cresyl esters of pentadecyl sulfonic acid.

23. The composition of claim 22, wherein the rubber particles have an average particle size of less than 500 nm.

24. The composition of claim 22, wherein at least a portion of the rubber particles are provided to the composition in the form of a stable dispersion in an epoxy resin.

25. The composition of claim 22, wherein the composition additionally comprises at least one auxiliary impact modifier/toughening agent.

26. The composition of claim 22, wherein the composition additionally comprises, as an auxiliary impact modifier/toughening agent, at least one epoxy-based prepolymer obtained by reacting one or more amine-terminated polymers with one or more epoxy resins.

27. The composition of claim 22, wherein the at least one epoxy resin is selected from the group consisting of diglycidyl ethers of bisphenol A and bisphenol F.

28. The composition of claim 22, wherein the composition additionally comprises, as an adhesion promoter, at least one chelate-modified epoxy resin.

29. The composition of claim 22, wherein the rubber particles have a core-shell structure.

30. The composition of claim 29, wherein the rubber particles have a core comprising a diene homopolymer, diene copolymer or polysiloxane elastomer.

31. The composition of claim 29, wherein the rubber particles have a shell comprising an alkyl (meth)acrylate homopolymer or copolymer.

32. The composition of claim 22, wherein the rubber particles have an average particle size of less than about 250 nm.

33. The composition of claim 22, wherein the composition contains from about 0.1 to about 2 weight % antioxidant, about 0.1 to about 3 weight % platy filler, and about 1 to about 8 weight percent sulfonate plasticizer.

34. A method of making a composite article which comprises: contacting a surface with the composition of claim 22 and curing the composition in contact with the surface to prepare a composite article.

35. The method of claim 34, wherein at least two surfaces are contacted with the composition and cured in contact therewith.

36. The method of claim 34, wherein the surface is contaminated with at least one oily substance and the composition contains at least one chelate-modified epoxy resin.

37. A composition comprising:
A) at least one epoxy resin;
B) rubber particles;
C) at least one platy filler;
D) at least one antioxidant;
E) at least one heat-activated latent curing agent; and
F) at least one sulfonate plasticizer;
wherein the at least one sulfonate plasticizer is selected from the group consisting of alkyl sulfonic acid esters of phenolic compounds.

* * * * *

UNITED STATES PATENT AND TRADEMARK OFFICE
CERTIFICATE OF CORRECTION

PATENT NO. : 8,673,108 B2
APPLICATION NO. : 12/363830
DATED : March 18, 2014
INVENTOR(S) : Liang et al.

It is certified that error appears in the above-identified patent and that said Letters Patent is hereby corrected as shown below:

In the Specification

Column 4, line 67: Change "hydroxy acrylates" to -- hydroxyacrylates --.

Column 13, line 17: Change "[O-(CH$_2$)$_3$-O" to -- [O-(CH$_2$)$_2$-O --.

Column 14, line 12: Change "hydroxy)" to -- hydroxyl --.

Signed and Sealed this
First Day of March, 2016

Michelle K. Lee
*Director of the United States Patent and Trademark Office*